March 4, 1958
L. W. PRICE
2,825,862
CLUTCH DEVICE AND MOTOR SWITCHING MEANS
Filed July 27, 1955
2 Sheets-Sheet 1
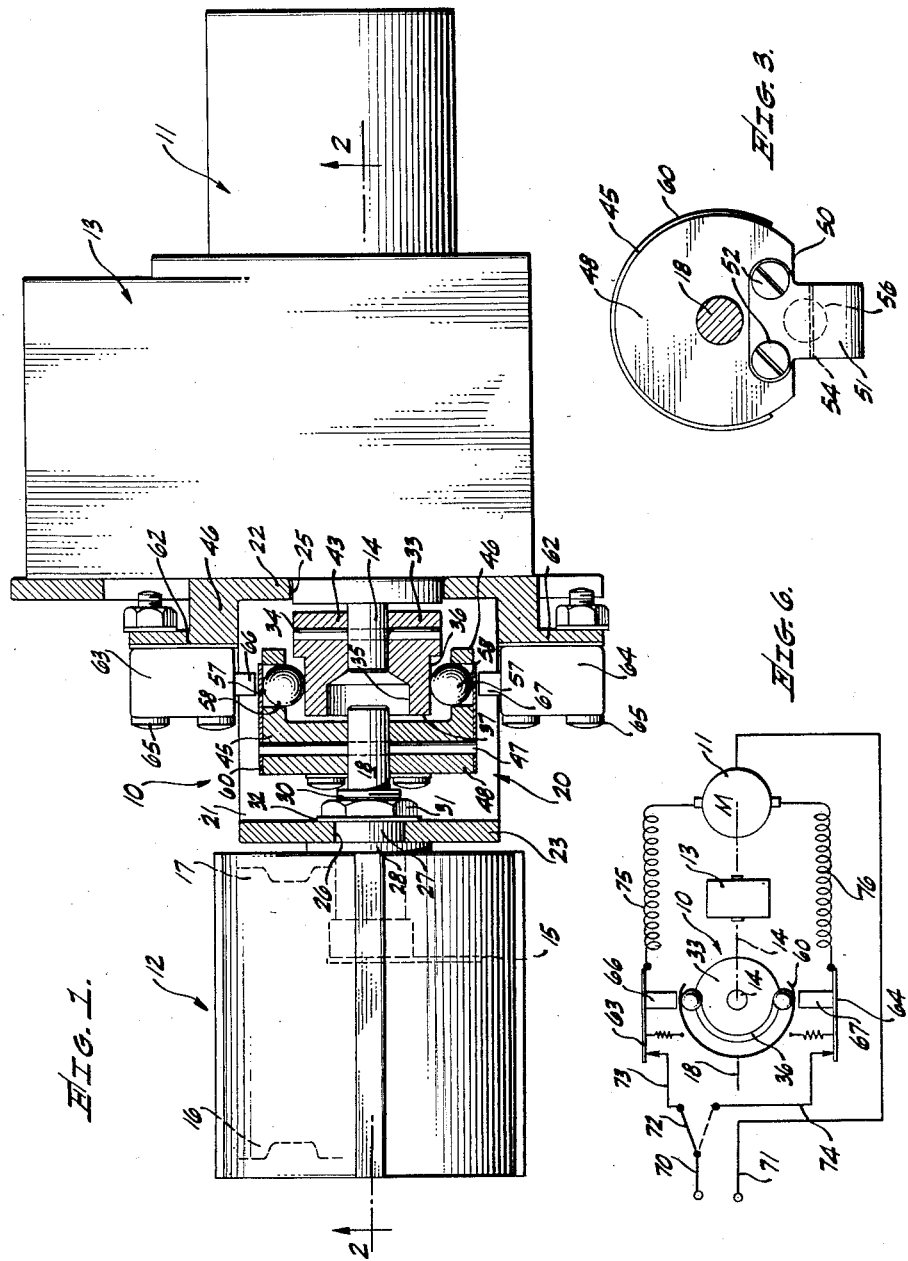
INVENTOR.
LEONARD W. PRICE
BY
Henry Heyman
ATTORNEY.

March 4, 1958 L. W. PRICE 2,825,862
CLUTCH DEVICE AND MOTOR SWITCHING MEANS
Filed July 27, 1955 2 Sheets-Sheet 2

INVENTOR.
LEONARD W. PRICE,
BY Henry Heyman
ATTORNEY.

United States Patent Office 2,825,862
Patented Mar. 4, 1958

2,825,862

CLUTCH DEVICE AND MOTOR SWITCHING MEANS

Leonard W. Price, Los Angeles, Calif., assignor to Hughes Aircraft Company, Culver City, Calif., a corporation of Delaware Application July 27, 1955, Serial No. 524,780

4 Claims. (Cl. 318—469)

This invention relates to driving mechanisms and relates more specifically to clutch type overrunning driving mechanisms for use between driving and driven devices.

In the operation of various types of driven mechanisms such as, for example, various electrical arrangements, it is often desirable, and in some cases necessary, that such mechanisms be driven at a constant rotational speed irrespective of the speed of a driving means, such as a motor, and further, irrespective of acceleration or deceleration periods of the motor. In relatively delicate electrical apparatus, it is very important that the driving means for this apparatus be connected thereto in a manner to eliminate any possibility of damage due to forces applied thereto or due to overtravel thereof past stops or travel limits.

Heretofore, various types of driving mechanisms have been utilized for interconnecting driving and driven apparatus, with stops being provided and limit switches being positioned in a manner either physically to bind the driving means or interrupt power supply thereto. However, these mechanisms and switches have been effective during the acceleration and deceleration periods of the driving means even though such periods may be relatively short as far as a time factor is concerned. In the driving of electrical apparatus such as, for example, potentiometer and the like utilized as components of electrical or electronic circuitry, it is often mandatory that the rate of movement of elements of the potentiometer be constant over the entire distance of travel thereof, in order that such circuitry may function in a prescribed predetermined manner. Prior devices have failed to accomplish this desired type of interconnection of driving and driven means.

It is, accordingly, one important object of the present invention to provide a novel interconnecting arrangement between driving and driven apparatus.

It is another important object of the present invention to provide a novel overrunning clutch mechanism adapted for disposition between driving and driven means.

It is a further important object of the present invention to provide a novel overrunning clutch mechanism for disposition between an electrically operated driving means and a driven device, such clutch mechanism including means for interrupting delivery of energy to the driving device.

It is still another important object of the present invention to provide an overrunning clutch mechanism adapted for disposition between an electrically operated motor and electrical apparatus to provide rotational interconnection therebetween, such clutch mechanism being simple in construction, effective in operation, reliable in use, and capable of being manufactured in mass production situations and without necessity for the holding of close tolerances in the various components thereof.

Other and further important objects of the present invention will become apparent from the disclosures in the following detailed specification, appended claims and accompanying drawings, wherein:

Figure 1 is a top plan view, partially in section, of the present clutch device;

Fig. 3 is a fragmentary sectional view through portions of the driving mechanism as taken substantially as indicated by line 3—3, Fig. 2;

Fig. 6 is a schematic diagram showing the electromechanical arrangement associated with the present clutch device.

Figure 5:
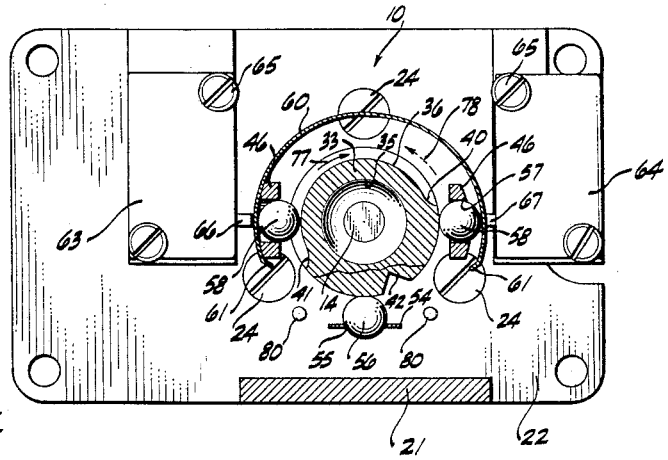
Fig. 5 is a transverse sectional view similar to Fig. 4 with components being shown in different positions.

With reference to the drawings, the present clutch mechanism is indicated generally at 10 and disposed between a driving device, such as an electric motor 11, and a driven device, such as one type of potentiometer indicated generally at 12. In most instances, for efficiency, electric motors must be rotated at relatively high speeds, and it is necessary to utilize a speed reducing means such as, for example, a transmission 13, in order that an output shaft 14 from the transmission may be rotated at speeds in the nature of 10 R. P. M.

The potentiometer 12, or any other driven mechanism, includes, as an integral portion thereof, a movable member 15, which may be in the form of a contact arm, and a pair of integral stops 16 and 17 for the remote ends of travel of the contact arm 15. The particular type of potentiometer illustrated may be of the helical variety having a helically disposed resistance element mounted in such a manner as to require several turns of the contact arm in traversing the resistance element from one end thereof to the other. Without departing from the spirit and scope of the present invention, it is to be understood that the driven device may include any of a variety of mechanisms requiring rotary movement for either a portion of one turn or several turns and including stops at the ends of travel thereof. In most instances, driven devices of the type described include an input shaft, as for example a shaft 18 disclosed herein.

With specific reference to the clutch mechanism 10, this mechanism includes a generally U-shaped bracket structure 20 having a base member 21 and end portions 22 and 23. The end portion 22 is secured to the transmission 13 by means of screws 24 or the like and is provided with an enlarged annular opening 25 through which the shaft 14 extends. The bracket portion 23 is provided with an annular opening 26 through which an enlarged portion 27 of the shaft 18 extends. The shaft 18 is further provided with a flange 28 that is adapted to bear against one side of the bracket portion 23 and is further threaded as at 30 for reception of a nut 31 which cooperates with a washer 32 that bears against the other side of the bracket member 23, in order to support the driven potentiometer device 12 in position with respect to the motor 11 and transmission 13. The output shaft 14 from the transmission 13 and the input shaft 18 for the potentiometer 12 are in axial coextensive alignment with each other.

Figure 2:
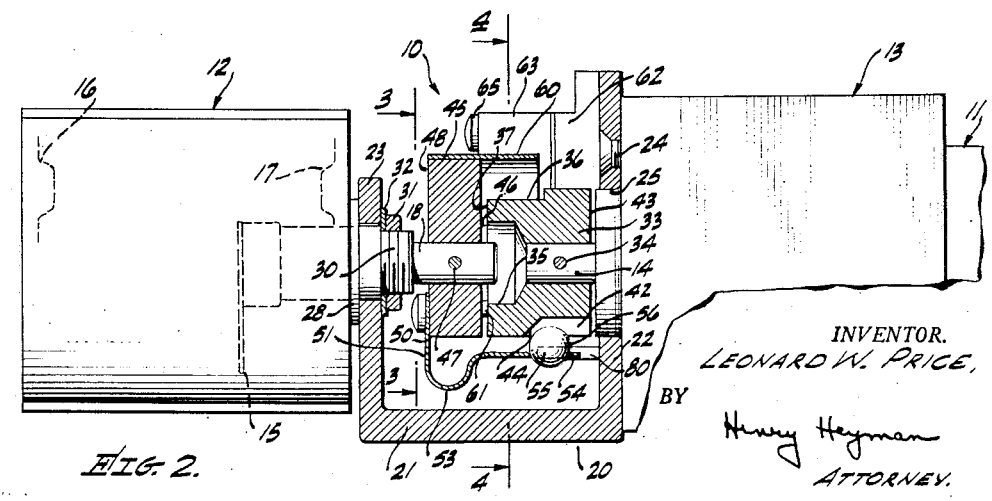
Fig. 2 is a sectional view partially in elevation taken substantially as indicated by line 2—2, Fig. 1.

With reference primarily to Figs. 1 and 2, a clutch member 33 is secured to the transmission output shaft 14 by means of a transversely disposed pin 34. The clutch member 33 has a recess 35 in an end thereof remote from the shaft 14 and has a generally cylindrical outer surface. A semicircular groove 36 is provided in the outer surface of the clutch member 33 with one side of the groove 36 communicating with an outermost end 37 of the clutch member. As shown primarily in Figs. 4 and 5, the semicircular groove 36 has rounded ends 40 and 41 that are utilized for a purpose to be hereinafter more fully described. The clutch member 33 is further provided with a peripheral axially extending elongated notch 42 that extends from an inner end 43 of the clutch member to approximately the central axial area thereof. The notch 42 is generally V-shaped and has an angularly disposed end 44.

With reference again to Figs. 1 and 2, the input shaft 18 for the driven device 12 has connected thereto a clevis member 45 having integral arm portions 46 disposed in parallel relationship to each other and to the axis of the shaft 18. The arms 46 extend in an axial direction over the outer surface of the clutch member 33 and in spaced relationship to this outer surface. The clevis member 45 is mounted on and secured to the shaft 18 by means of a transversely disposed pin 47 and has a radially extending planar surface 48, one side of the clevis member being cut away as at 50 and on a cord thereof. A driving arm 51, which may be made from relatively thin spring material, has one end mounted on the surface 48 and secured to the clevis member 45 by means of screws 52. The driving member 51 has a curved portion 53, Fig. 2, and a straight portion 54 that is disposed parallel to the coextensive axes of the shafts 14 and 18. The portion 54 of the driving member 51 has an enlarged opening 55 disposed therethrough adjacent an end thereof, there being a driving ball 56, having a diameter larger than the diameter of the opening 55, and disposed in this opening. The ball 56 is adapted normally for disposition in the clutch member notch 42 and is biased into relatively tight contact with this notch by action of the spring driving member 51. Thus it may be seen that the clutch member 33 and the clevis member 45 are connected in such a manner that rotation of the clutch member 33 will also effect rotation of the clevis member 45, with rotary force being transmitted from one of these members to the other through the driving ball 56 and spring driving arm 51.

Figure 4:
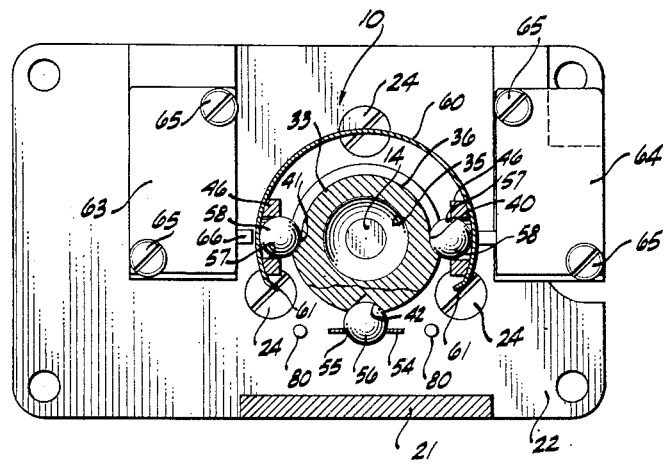
Fig. 4 is a transverse sectional view taken substantially as indicated by line 4—4, Fig. 2.

As shown primarily in Figs. 1, 4 and 5 the clevis member arms 46 are provided with aligned openings 57 that are disposed radially with respect to the shafts 14 and 18. One each of a pair of actuating balls 58 is disposed in each of the openings 57, with the diameters of the balls 58 being just slightly smaller than the diameter of the aligned openings 57 in order that there may be free movement of the balls through these openings. The balls 58 are adapted for engagement with the circumferential surface of the groove 36 on the clutch member 33 or with the outer surface of the clutch member, as will be described more in detail hereinafter, and are urged toward these surfaces by means of a semicircular leaf spring 60 that is disposed about outer surfaces of both the body of the clevis member 45 and the arms 46 depended therefrom. Ends of the leaf spring 60 are bent inwardly toward each other as at 61 in order to retain the spring in position with these inwardly bent ends being adapted for disposition adjacent side edges of the clevis arms 46.

As shown again in Figs. 1, 4 and 5, the bracket portion 22 is provided with raised integral portions 62 on which are mounted a pair of normally closed switches 63 and 64 that are secured in position on the portion 62 by means of suitable screws 65. The switches 63 and 64 have push-type operating members 66 and 67 respectively which extend inwardly toward each other and lie radially outwardly from the balls 58 and clutch member groove 36.

In operation of the present mechanism, the particular dimensions thereof and rotary requirements of the driven device 12 are assumed to be known, with the device 12 having the integral stops 16 and 17 therein arranged at like axially aligned positions within the case thereof. The positions of the various components of the present clutch apparatus will normally be as shown in Fig. 5 when the movable contact member or arm 15 is moved to one axial end or the other of the driven device 12 and resides against one of the stops 16 or 17. In this particular position, it is to be noted that the switch 64 has had its actuating member 67 depressed by action of one of the balls 58 acting through the semicircular spring 60 and being urged radially outwardly by reason of the disposition of the ball on the outer surface of the clutch member 33. The other of the balls 58 is disposed in contact with the annular surface of the groove 36. The portion of the spring 60 overlying this ball 58 is disposed in contact with the outer radial surface of the respective clevis arms 46.

With reference to Fig. 6, a suitable electrical circuit is provided in association with the present device wherein input electrical energy is supplied through a pair of leads 70 and 71. The lead 70 has a double pole switch 72 disposed therein, one of the poles extending by way of a lead 73 to the switch 63, the other pole extending by way of a lead 74 to the switch 64. The switch 63 is connected to one directional winding 75 of the motor 11, while a lead from the switch 64 is connected to an opposite directional winding 76 of the motor 11. The lead 71 extends directly to the motor 11 to provide the other side of the essential circuit.

With the clutch device in the position shown in Fig. 5 and the normally closed switch 64 being maintained in an open position, the switch 72 need thereafter only be moved to the solid line position shown in Fig. 6, whereby to energize the directional winding 75 of the motor 11 to drive the clutch member 33 in the direction of the arrow 77 shown in Fig. 5. It is also to be noted that the driving ball 56 is removed from the notch 42 in the clutch member 33 and initial rotation of the motor 11 merely serves to drive the clutch member 33 with there being no immediate connection established between the clutch member and the clevis member 45. Thus, time is gained for the motor 11 to accelerate to full speed before the driving ball 56 is permitted to enter the notch 42 and commence rotation of the clevis 45, shaft 18 and movable arm 15 in the driven device 12. This rotation continues until the arm 15 engages an opposite ended stop member 16 or 17, with the various components of the apparatus being in the positions shown in Fig. 4 during rotary driving thereof. It is also to be noted that as the driving ball 56 enters the notch 42, the balls 58 will be both positioned in contact with the rounded ends 40 and 41 of the semicircular groove 36, there being slight driving action by means of this interconnection. When the driven arm 15 engages one of the stops 16 or 17, a slight resistance to rotation of the shaft 18 and the clevis 45 will be experienced, whereby to cause the driving ball 56 again to ride out of the notch 42 with the other of the balls 58 leaving the end 41 of the groove 36 and to ride upon the outer surface of the clutch member 33, thus to actuate and open the switch 63 through its operating member 66 and interrupt the flow of electrical energy to the motor 11.

It may thus be noted that the motor 11 is operating at peak R. P. M before engagement thereof with the driven mechanism 12, and that the motor is deenergized following disconnection thereof from the driven device 12. Thereafter, the motor is permitted to decelerate without effecting the driven device 12. Additionally, a light spring pressure exerted by the driving arm 53 on the driving ball 56, and the disposition of the ball within the V-shaped notch 42, serves to protect the delicate stops 16 and 17, the ball 56 being permitted to leave the notch 42 at a very slight resistance to movement of the shaft 18. Upon movement of the switch 72 to the position shown by the dotted lines in Fig. 6, the other directional winding 76 will be energized, whereby to rotate the clutch member 33 in the direction shown by the dotted arrow 78, Fig. 5, and thereby to move and rotate the contact arm 15 in an opposite direction until ultimate engagement with an opposite stop member 16 or 17, whereupon the ball 58 will leave the end 40 of the groove 36 and reside in the position shown in Fig. 5 with the switch 64 being again opened to terminate the flow of electrical energy to the motor 11 and permit deceleration thereof in the manner described hereinbefore.

In the event the motor 11 should continue to decelerate in either direction for a length of time greater than normal, and the clevis 45 should have a tendency to be rotated beyond the stop point thereof, one or the other of the ends 61 of the leaf spring 60 will engage one or the other of a pair of stop pins 80 connected to and disposed outwardly from an inner surface of the bracket member 22. It is to be noted that the position of the stop pins 80 is such as to prevent contact thereof with the ends of the leaf spring 60 during normal rotation of the components of the present mechanism unless one of the balls 58 is residing upon the outer surface of the clutch member 33 and the spring 60 is forced radially outwardly by means of this one of the balls 58.

Having thus described the invention and the present embodiment thereof, it is desired to emphasize the fact that many modifications may be resorted to in a manner limited only by a just interpretation of the following claims.

What is claimed is:

1. A clutch mechanism, adapted for disposition between a driving electric motor and a rotary driven device having integral stops for limiting rotation of components thereof, said mechanism comprising, in combination: a bracket disposed between said motor and said driven device; a clutch driving member connected with said motor; a driven member connected with said driven device and having portions overlying said driving member; a driving arm carried by said driven member; a ball carried by one end of said arm; a notch in a peripheral portion of said driving member, said ball being adapted for removable disposition in said notch, whereby operatively to connect said members; a semicircular groove about said driving member; a pair of balls carried by said portions of said driven member, said pair of balls being adapted for disposition in said groove; a leaf spring disposed about and carried by said driven member, said spring being disposed in cooperation with said pair of balls, whereby to bias said pair of balls into contact with a surface of said groove; a pair of electric switches mounted on said bracket; an an electric circuit interconnecting said switches and said motor, said switches being operatively associated with said leaf spring and said balls whereby, upon contact of a component of said driven device with one of said stops therein and resistance to movement of said driven member, to force one of said balls out of said groove and onto an outer surface of said driving member, thereby moving portions of said spring radially outwardly to actuate one of said switches to terminate flow of electrical energy to said electric motor.

2. A clutch mechanism, adapted for disposition between a driving bidirectional electric motor and a rotary driven device having integral stops for limiting rotation of components thereof, said mechanism comprising, in combination: a bracket disposed between said motor and said driven device; a clutch driving member connected with said motor; a clevis-shaped driven member connected with said driven device and having portions radially overlying said clutch driving member; a spring driving arm carried by said driven member; a ball carried by one end of said arm; a notch in a peripheral portion of said driving member, said ball being adapted for removable disposition in said notch, whereby operatively to connect said members; a semicircular groove about said driving member; a pair of balls carried by said portions of said driven member, said pair of balls being adapted for disposition in said groove; a semicircular leaf spring disposed about and carried by said driven member, said spring being disposed in cooperation with said pair of balls, whereby to bias said pair of balls into contact with a surface of said groove; a pair of electric switches mounted on said bracket; and an electric circuit interconnecting said switches and said motor, said switches being operatively associated with said leaf spring and said pair of balls whereby, upon contact of a component of said driven device with one of said stops therein and resistance to movement of said driven member, to force one of said pair of balls out of said groove and onto an outer surface of said driving member, thereby moving portions of said spring radially outwardly to actuate one of said switches to terminate flow of electrical energy to said electric motor.

3. An overrunning clutch mechanism, adapted for disposition between a driving bidirectional electric motor and a rotary driven device having integral stops for limiting rotation of components thereof, said mechanism comprising, in combination: a bracket disposed between said motor and said driven device; a clutch driving member connected with said motor; a clevis-shaped driven member connected with said driven device and having portions radially overlying said clutch driving member; a spring driving arm carried by said driven member; a ball carried by one end of said arm; a notch in a peripheral portion of said driving member, said ball being adapted for removable disposition in said notch, whereby operatively to connect said members; a semicircular groove about said driving member; a pair of balls carried by said portions of said driven member, said pair of balls being adapted for disposition in said groove; a semicircular leaf spring disposed about and carried by said driven member, said spring being disposed in cooperation with said pair of balls, whereby to bias said balls into contact with a surface of said groove; a pair of electric switches mounted on said bracket, and an electric circuit interconnecting said switches and said motor, said switches being disposed radially outwardly from said leaf spring and said pair of balls whereby, upon contact of a component of said driven device with one of said stops therein and resistance to movement of said driven member, to force one of said pair of balls out of one end of said groove and onto an outer surface of said driving member, thereby moving portions of said spring radially outwardly to actuate one of said switches to terminate flow of electrical energy to said electric motor.

4. An overrunning clutch mechanism, adapted for disposition between a driving bidirectional electric motor and a rotary driven device having integral stops for limiting rotation of components thereof, said mechanism comprising, in combination: a U-shaped bracket disposed between and connected to said motor and said driven device; a clutch driving member connected with said motor; a clevis-shaped driven member connected with said driven device and having arm portions radially overlying said clutch driving member; a spring driving arm carried by said driven member; a ball carried by one end of said arm; a longitudinal elongated notch in a peripheral portion of said driving member, said ball being adapted for removable disposition in said notch, whereby operatively to connect said members; a semicircular groove about said driving member; a pair of balls carried by said portions of said driven member, said pair of balls being adapted, during driving of said motor, for disposition in said groove; a semicircular leaf spring disposed about and carried by said driven member, said spring carrying said pair of balls in a manner to bias said balls into contact with a surface of said groove; a pair of electric switches mounted on said bracket; and an electric circuit interconnecting said switches and said motor, said switches being mounted on said bracket and disposed radially outwardly from said leaf spring and said pair of balls whereby, upon contact of a component of said driven device with one of said stops therein and resistance to movement of said driven member, to force one of said pair of balls out of one end of said groove and onto an outer surface of said driving member, thereby moving portions of said spring radially outwardly to actuate one of said switches to terminate flow of electrical energy to said electric motor.

References Cited in the file of this patent

UNITED STATES PATENTS

| | | |
|---|---|---|
| 1,883,164 | Vassakos | Oct. 18, 1932 |
| 2,519,598 | Patten | Aug. 22, 1950 |
| 2,652,135 | Flaton | Sept. 15, 1953 |